INVENTOR.
ROBERT B. McEUEN
BY Edward H. Fung
ATTORNEY.

United States Patent Office 3,394,308
Patented July 23, 1968

3,394,308
METHOD FOR DETERMINING PRESENCE OF SUSPENDED PARTICLES IN LIQUIDS WITH THE USE OF A VERY LOW FREQUENCY OSCILLATOR
Robert B. McEuen, Barrington, Ill., assignor to Union Oil Company of California, Los Angeles, Calif., a corporation of California
Filed Aug. 2, 1965, Ser. No. 476,419
6 Claims. (Cl. 324—61)

This invention relates to method and apparatus for detecting the presence of finely divided suspended material in liquids and is more particularly concerned with method and apparatus utilizing low frequency current to detect and/or measure colloidally suspended material in liquids.

It is well known that liquids may carry in suspension particles of colloidal dimensions which are objectionable in the use for which the liquid is intended. As an example, it is extremely important that solid particle contamination in jet fuel be reduced to very low amounts in order to prevent malfunctioning of and injury to the jet engines in airplanes.

Another instance where the detection or determination of the suspended contamination in liquid products is important is in the detection of the interface between different products or similar products from different sources flowing in pipelines. Although devices are known which attempt to detect interface by dielectric measurement, such devices operate on relatively high current frequencies and are not capable of detecting the presence of or measuring particles of macromolecular or colloidal dimensions. The use of such high frequency devices is disclosed in U.S. Patents Nos. 2,654,067 and 2,859,757.

I have discovered that the presence of finely divided suspended particles of colloidal or macromolecular size can be detected and measured by subjecting liquids containing such particles, while present as the dielectric in a capacitor cell, to low frequency current of the order of 0.001 to 1 cycle per second, measuring the portion of current, $Ii$, in phase with the voltage, $Vg$, from the low frequency generator and measuring the portion of the current, $Io$, 90° out of phase with said voltage. By substituting the values determined in the following equations:

$$\frac{E'}{E_o} = \frac{I_o d}{E_o V g A W} \text{ relative dielectric constant} \quad (1)$$

where $E'$ is the dielectric constant of the liquid under test and $E_o$ is the dielectric constant of the free space; and $$E'' = \frac{I_i d}{V g A W} \text{ loss factor} \quad (2)$$

where $d$ is the distance between the plates of the measuring cell, $A$ is the area of one of the plates and $W$ is the angular frequency, $2\pi f$, of the applied voltage, the dielectric properties of a liquid can be obtained or a difference in dielectric properties of adjacent liquids in a pipe-line detected, thereby enabling the determination of the extent of colloidal contamination or making possible the detection of the interface between two closely similar liquids.

Figure 2:
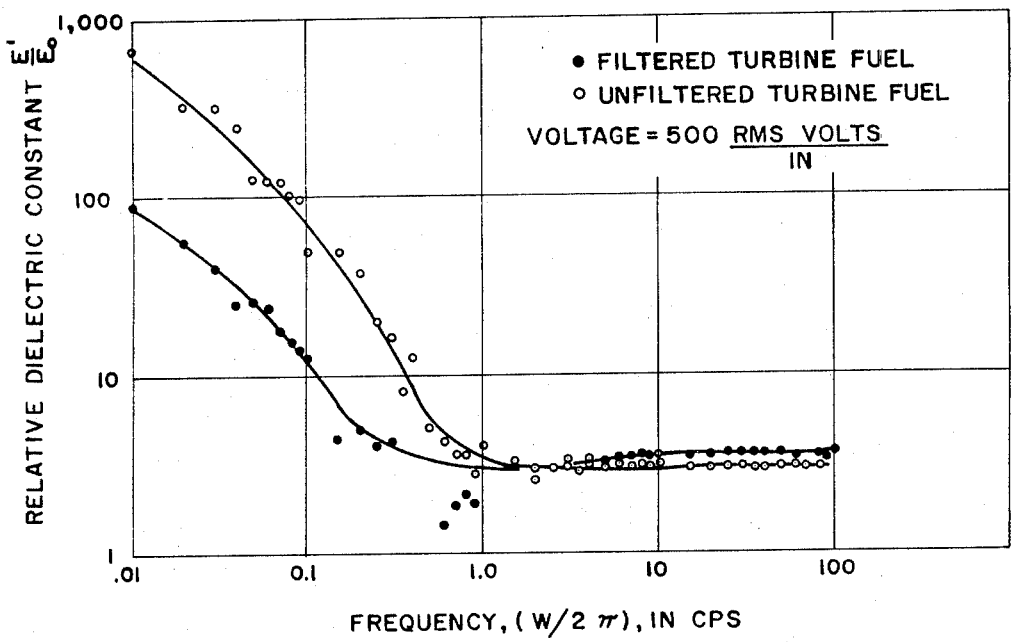
Figure 1:
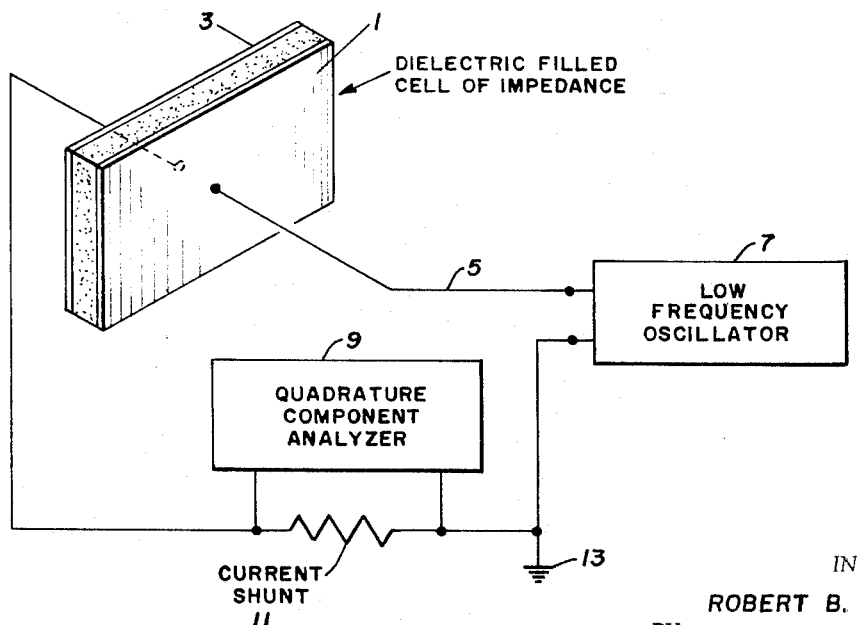

An object of the invention is to provide a method for detecting the presence of and/or measuring the amount of finely divided suspended material in hydrocarbon liquids. A further object of the invention is to detect the presence and/or measure the amount of macromolecular colloidal suspended material in hydrocarbon liquids, such as gasoline, kerosene and jet fuel. A still further object of the invention is to provide a method for detecting the presence and/or measuring the amount of finely suspended material in hydrocarbon liquids through the use of low frequency current. Still another object of the invention is to provide apparatus for detecting the presence and/or measuring the amount of finely divided material suspended in liquids by means of low frequency current. Other objects of the invention will manifest themselves from the following drawing, of which FIGURE 1 is a diagrammatic flow sheet of apparatus in accordance with the invention; and FIGURE 2 is a graph in which relative dielectric constant is plotted against frequency for filtered and unfiltered turbine fuel.

Referring to the drawing, the numerals 1 and 3 indicate parallel spaced plates of a capacitor cell. The plates may be suitably held in insulated spaced relation by any conventional means so that they may be placed in a vessel or line in which the fluid to be tested is present or flowing. In order to achieve desirable results it is important that the area of plates 1 and 3 be large as compared to the space between the plates. A suitable relationship is about 50 sq. in. of area per plate per .01 in. of distance between the plates. A preferred relationship is 100 sq. in. of plate area and a distance of .02 in. between the plates.

The plates 1 and 3 are connected serially in an electric circuit 5 in which are also serially connected a low frequency oscillator 7 and a quadrature component analyzer 9. A resistance shunt 11 is connected in parallel with the analyzer. The circuit is grounded as shown at 13. The low frequency oscillator must be one capable of generating current at a frequency of about 0.001 to 1 cycle per second, and preferably 0.01 to 0.1 cycle per second. If the frequency of the current fed to the capacitor is not of the low order herein stated, it is not possible to accurately determine the colloidal contamination of the liquid. A suitable low frequency oscillator or signal generator is the variable phase Model 711A–1, Boonshaft and Fuchs Inc. generator described in that company's Bulletin No. 711A–1. The quadrature component analyzer may also be a Boonshaft and Fuchs Inc. analyzer, such as that shown in its Bulletin 711A entitled "Model 711A Frequency Response Analyzer." The impedance of the capacitor is much greater than that of the shunt 11, the relationship being of the order of 100 to 1.

The following data in Table I on relative dielectric constant, $E'/E_o$, and AC conductivity, $g$, where $$g = WE'' \quad (3)$$

for unfiltered and filtered jet fuel were obtained in accordance with this invention using a frequency of .01 to .1 at a voltage of 10 volts (RMS), a spacing of .02 inch and a plate area of 82.5 inches.

TABLE I

| Frequency (c.p.s.) | Unfiltered | | Filtered | |
|---|---|---|---|---|
| | $E'/E_o$ | g. (picomhos/meter) | $E'/E_o$ | g. (picomhos/meter) |
| .01 | 690 | 2,820 | 94.6 | 315 |
| .02 | 344 | 3,520 | 58 | 398 |
| .03 | 330 | 4,300 | 40 | 468 |
| .04 | 258 | 4,850 | 25.8 | 600 |
| .05 | 129 | 5,150 | 28.4 | 688 |
| .06 | 129 | 5,450 | 25.8 | 760 |
| .08 | 112 | 5,850 | 16.1 | 890 |
| .09 | 100 | 6,000 | 14.4 | 960 |

The jet fuel tested was Type A–1 Turbine Fuel, produced at the Lemont Illinois refinery of the Pure Oil Company.

Attention is called to the order of magnitude difference, i.e., a ten-fold difference in values of dielectric constant and conductivity for the filtered and the unfiltered fuel. By means of my invention it is possible to detect contamination as low as 0.5 milligram per liter.

FIGURE 2 shows values of relative dielectric constant obtained for filtered and unfiltered fuel over the frequency range of 0.01 to 100. It will be apparent that between 0.01 and 1.0 frequency the difference in relative dielectric constant is apparent but that above a frequency of 1, the relative dielectric frequencies overlap.

Whereas the data obtained in Table I will suffice to distinguish two different liquids flowing in a pipeline, it does not give definite information as to the amount of contamination. In order to make the data in Table I meaningful in terms of amount of solid particle contamination, instruments can be calibrated to read directly in terms of contamination as for example milligrams of solid particles per gallon of liquid. But since the instrument would have to be calibrated for each liquid, a more pragmatic approach is to determine the relative dielectric constant and conductivity values at different frequencies for each liquid to be tested, free of contamination, and plot these values on separate graphs against frequency, similar to FIGURE 2. A curve can be then drawn through the points. This process is repeated after dispersing different known amounts of colloidal solid particles in the liquid. A series of curves will thus be obtained, each for a different known level of contamination. By plotting the value $E'/E_o$ and $g$ for the unknown sample, after determining these values, the amount of contamination can be read on the graph.

The objects of the invention in which an exclusive property or privilege is claimed are defined as follows:

1. The method of determining the dielectric properties of liquid containing small particles suspended therein comprising filling the space between the plates of a capacitor having a high ratio of plate area to plate spacing with the liquid to be tested, passing current from a variable phase, low frequency oscillator through the capacitor circuit at a frequency of about 0.001 to 1 cycle per second, measuring the percent of current in phase with the oscillator voltage and the percent of current 90° out of phase with the oscillator voltage, and determining the dielectric properties of the liquid.

2. Method in accordance with claim 1 in which the plate area is not less than 50 square inches per 1/100 inch of distance between said plates.

3. The method in accordance with claim 2 in which the frequency is between 0.01 and 0.1 cycle per second.

4. The method in accordance with claim 3 in which the percent current in phase and 90° out of phase is measured by a quadrature component analyzer.

5. In the method for determining the amount of finely suspended material in hydrocarbon liquids, the steps comprising filling the space between the plates of a capacitor with said liquid, said plates having a ratio of area to distance between plates of not less than 5000 to 1, passing current of frequency of about 0.001 to 1 cycle per second generated by a low frequency oscillator through the capacitor circuit, determining the portion of said current in phase with the oscillator voltage and determining the portion of said current 90° out of phase therewith.

6. The method in accordance with claim 1 in which the relative dielectric constant of the liquid is determined before and after filtering the liquid.

References Cited

Dillman, Experimental Determination of Electrical Parameters of Ionic Solutions, Iowa State University of Science and Technology, Library Book No. QD 115 D586e, Accession No. T15120, pp. i–v, 1–10, 13–16, 19–53.

RUDOLPH V. ROLINEC, *Primary Examiner.*

E. E. KUBASIEWICZ, *Assistant Examiner.*